United States Patent
Reitz et al.

(10) Patent No.: US 9,267,554 B2
(45) Date of Patent: Feb. 23, 2016

(54) TORQUE TRANSMISSION DEVICE

(71) Applicant: Schaeffler Technologies AG & Co. KG, Herzogenaurach (DE)

(72) Inventors: Dierk Reitz, Baden-Baden (DE); Willi Ruder, Lahr (DE); Stefan Mackowiak, Malsch (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 41 days.

(21) Appl. No.: 14/054,023

(22) Filed: Oct. 15, 2013

(65) Prior Publication Data

US 2014/0034443 A1 Feb. 6, 2014

Related U.S. Application Data

(63) Continuation of application No. PCT/DE2012/000398, filed on Apr. 17, 2012.

(30) Foreign Application Priority Data

May 5, 2011 (DE) .......................... 10 2011 100 694

(51) Int. Cl.

| F16D 23/12 | (2006.01) |
|---|---|
| B60K 6/26 | (2007.10) |
| B60K 6/48 | (2007.10) |
| B60K 6/387 | (2007.10) |
| F16F 15/121 | (2006.01) |

(52) U.S. Cl.
CPC . *F16D 23/12* (2013.01); *B60K 6/26* (2013.01); *B60K 6/48* (2013.01); *B60K 6/387* (2013.01); *B60Y 2300/205* (2013.01); *B60Y 2304/01* (2013.01); *B60Y 2400/4242* (2013.01); *F16F 15/121* (2013.01); *Y02T 10/6221* (2013.01)

(58) Field of Classification Search
CPC ....... F16D 23/12; F16D 25/08; F16D 25/087; F16D 25/12; B60K 6/26; B60K 6/387; B60K 6/40; B60K 6/48; B60K 2006/4825; B60Y 2300/205; B60Y 2304/01; B60Y 2400/4242; F16F 15/121; Y02T 10/6221

See application file for complete search history.

(56) References Cited

U.S. PATENT DOCUMENTS

| 5,789,823 | A | 8/1998 | Sherman |
|---|---|---|---|
| 6,354,974 | B1 | 3/2002 | Kozarekar |
| 6,478,101 | B1 | 11/2002 | Taniguchi et al. |
| 6,585,066 | B1 * | 7/2003 | Koneda et al. ............. 180/65.25 |
| 6,628,021 | B2 | 9/2003 | Shinohara et al. |
| 6,668,953 | B1 | 12/2003 | Reik et al. |
| 2007/0108857 | A1 | 5/2007 | Nomura et al. |
| 2009/0283344 | A1 * | 11/2009 | Arnold et al. ............. 180/65.22 |
| 2011/0263370 | A1 * | 10/2011 | Borntraeger et al. ............ 475/5 |
| 2013/0079193 | A1 * | 3/2013 | Ohnemus et al. ................ 477/5 |
| 2013/0291374 | A1 * | 11/2013 | Ohnemus et al. .............. 29/598 |
| 2013/0310218 | A1 * | 11/2013 | Fujita et al. ....................... 477/5 |

FOREIGN PATENT DOCUMENTS

| DE | 100 36 504 | 2/2001 |
|---|---|---|
| DE | 10 2009 019585 | 11/2009 |
| EP | 1 710 113 | 10/2006 |
| FR | 2 791 008 | 9/2000 |
| JP | 2000343966 | 12/2000 |
| JP | 2001163071 | 6/2001 |
| JP | 2001238426 | 8/2001 |
| JP | 2004001708 | 1/2004 |
| WO | WO 01/76041 | 10/2001 |
| WO | WO 2008/025691 | 3/2008 |

* cited by examiner

*Primary Examiner* — Jacob S Scott
(74) *Attorney, Agent, or Firm* — Davidson, Davidson & Kappel, LLC (57) ABSTRACT

A torque transmission device for the drive train of a passenger car. The drive train includes two engines, wherein one of said engines is an electromechanical energy converter. The torque transmission device is inserted into a rotor recess, which is arranged in a rotor assembly of the electromechanical energy converter.

11 Claims, 5 Drawing Sheets

TORQUE TRANSMISSION DEVICE

This is a continuation and claims the benefit of International Application PCT/DE2012/000398, filed Nov. 5, 2013 which claims the benefit of German Patent Application DE 10 2011 100 694.3, filed May 5, 2011, both applications being hereby incorporated by reference herein.

The present invention relates to device for transmitting torque, in particular in a drive train of a motor vehicle. The invention will be described below in connection with a driving assembly for an automobile having multiple engines. It is to be understood that the proposed torque transmission device may be used independently of the construction of the motor vehicle and of the drive train.

BACKGROUND

Modern motor vehicles not only have to meet high expectations in terms of road performance (such as acceleration, maximum speed) and driving comfort (such as noise, vibration, and harshness behavior, NVH) but also in terms of the efficient use of resources available to the drive, in particular fuel consumption. In conventional motor vehicles, during non-negligible periods of time, the drive motor, frequently a combustion engine including a reciprocating piston, is operated in unfavorable ranges of operation; moreover, in particular during braking operations, energy that has previously been invested in driving the motor vehicle is mainly converted into heat that has no further use. In the last few years, the demand for a more efficient use of the fuel in particular to increase either traction power or mileage has led to the development of drive trains for motor vehicles that include several different driving engines. Motor vehicles that have such drive trains are commonly referred to as hybrid vehicles. The drive trains of these motor vehicles are frequently able to regain braking energy and to make it available to the drive of the vehicle. In addition, these drive trains frequently allow a shifting of the operating point of at least one driving engine, thus allowing a more efficient operation of the motor vehicle.

These requirements give rise to new requirements in particular in terms of the distribution of torques and power within these new drive trains. The distribution of torque and power is generally achieved by torque transmission devices. Although the number of functions that drive trains of such hybrid vehicles have to perform has increased, the installation space provided for them has not increased to the same degree. This means that modern drive trains frequently require torque transmission devices that incorporate many different functions in a comparatively small installation space yet with a high degree of operational reliability.

German Patent Document DE 100 36 504 A1 discloses to integrate a torque damper device, here a torsional vibration damper, and a torque transmission device, here a clutch, into a stator of an electro-mechanical energy converter in a drive train of a motor vehicle. The torque damper device is received radially inside the torque transmission device. The torque transmission device may be used to control whether power is transmitted to the driving wheels of the motor vehicle from a combustion engine or from an electromechanical energy converter. Due to the nested arrangement of the torque damper device and the torque transmission device in the electromechanical energy converter, the torque transmission device requires little installation space.

SUMMARY OF THE INVENTION

It is an object of the present invention to provide a torque transmission device, in particular for a drive train of a motor vehicle, for transmitting torque at an increased operational reliability within the available installation space.

The present invention provides a device, in particular a torque transmission device including a device for influencing and controlling that implements these functions at a high degree of operational reliability but without requiring increased installation space.

In the context of the present invention, a drive train is understood to be a device for transmitting driving power from at least one driving engine to at least one driving element of a vehicle, in particular a wheel/tire combination. This driving power is preferably transmitted within the drive train as a mechanical power, in particular characterized by a rotary speed and a torque. This speed and torque may be varied within the drive train. For this variation, a drive train preferably includes a transmission and/or a converter device. A drive train preferably includes a transmission device with a continuously variable transmission ratio, more preferably a transmission with a plurality of predefined transmission stages. In accordance with a further preferred feature, the transmission device is a gear train, preferably a planetary gear or a twin clutch transmission. In accordance with a further preferred feature, the drive train includes traction means or traction means transmissions, in particular shafts, articulated shafts or the like to transmit the driving power. In accordance with a further preferred feature, the driving power is transmitted from a torque transmission device to at least one drive train shaft; a drive train shaft is preferably embodied as a transmission input shaft.

In the context of the present invention, a primary driving engine is understood to be a driving engine that preferably provides a driving power to overcome rolling resistances that conflict with the movement of the vehicle. The primary driving engine preferably converts energy, which is preferably present in a chemical form, into mechanical power. In accordance with a further preferred feature, a primary driving engine is embodied as a heat engine. A primary driving engine is preferably embodied as a combustion engine, preferably a reciprocating engine, a rotary piston engine, or a free-piston engine. In accordance with a further preferred feature, the primary driving engine transmits its mechanical driving power to a primary power take-off shaft.

In the context of the present invention, a primary power take-off shaft is understood to be that device of a primary driving engine at which the driving power provided to drive the vehicle may at least partly be taken off. The driving power of the primary driving engine is preferably taken off by the primary power take-off shaft in the form of a torque and rotary speed. In accordance with a further preferred feature, the primary power take-off shaft is embodied as a crankshaft or an eccentric shaft.

In the context of the present invention, a secondary driving engine is understood to be a driving engine that is preferably provided to convert electrical power into mechanical power or vice versa. A secondary driving engine is preferably used to drive the motor vehicle or to brake the motor vehicle. In accordance with a further preferred feature, a secondary driving engine is embodied as an electromechanical energy converter. A secondary driving engine is preferably embodied as a DC engine, an AC engine, or a rotating electric field engine. For energy conversion purposes, a secondary driving engine preferably includes at least one stator device and at least one rotor device.

In the context of the present invention a stator device of said secondary driving engine is understood to be a device that is stationary relative to a rotor device. During operation of the secondary driving engine, preferably an electrical current flows in a stator device or a magnetic field originating therefrom is effective. In accordance with a further preferred feature, a stator device includes a cooling device, in particular to discharge heat.

In the context of the present invention, a rotor device of said secondary driving engine is understood to be a device that is preferably supported for rotation relative to the stator device. In accordance with a further preferred feature, said rotor device is arranged essentially inside said stator device. In accordance with a further preferred aspect, an electric current passes through said rotor device during operating of the secondary driving engine. In accordance with a further preferred feature, at least during operation thereof, a magnetic field for operating said secondary driving engine is available. In accordance with a further preferred feature, said rotor device includes a rotor recess.

In the context of the present invention, a rotor recess is understood to be a recess within said rotor device. Said rotor recess preferably extends along an axis of rotation of said rotor device and forms an open-edge recess. The rotor device is preferably supported in the stator device in such a way that the rotor device carries out a rotary movement about said axis of rotation during operation of the secondary driving engine. In accordance with a further preferred feature the rotor device is at least partly, preferably completely, interspersed with said rotor recess.

In the context of the present invention, a torque transmission device is understood to be a device provided to combine and transmit the driving power of said primary driving engine and/or of said secondary driving engine or to distribute driving power from the drive train onto the primary driving engine and/or to the secondary driving engine. In accordance with a further preferred aspect, a torque transmission device is provided to influence, preferably to reduce vibration that occurs in said drive train, in particular vibrations generated by the primary driving engine. A torque transmission device preferably includes a torque transmission element and a torque damper device.

In the context of the present invention, a torque transmission element is understood to be a device that is provided to influence the torque transmission in said drive train. A torque transmission element preferably has two operating conditions. In a first, closed operating condition, said torque transmission element may transmit a mechanical driving power. In a second, open operating condition, the torque transmission element is unable to transmit a mechanical driving power. A torque transmission element preferably includes a transmission input element, a transmission output element, and a transmission actuation device. In said closed operating condition, the transmitted mechanical power is preferably transmitted from said transmission input element to said transmission output element or vice versa. While torque is transmitted, said transmission input element and said transmission output element preferably contact each other.

A transmission actuation device is understood to be a device that converts an external control command for controlling said torque transmission element into an actuating force. Said transmission input element and/or said transmission output element is moved, preferably by said actuating force, to establish contact between said elements to transmit torque. In accordance with a further preferred feature, said actuating force causes said transmission input element and/or transmission output element to be moved in such a way that said elements do not contact each other. In accordance with a further preferred feature, a transmission actuation device includes at least one cylinder device, preferably for converting a hydraulic or pneumatic pressure into an actuating force.

In accordance with a further preferred feature, a transmission actuation device includes at least one device that has a ramp, preferably a threaded device or, more preferably, a wedge device for generating said actuating force. A transmission actuation device preferably includes a mechanical lever system for transmitting or increasing said actuating force. In accordance with a further preferred feature, a transmission actuation device includes an electromechanical energy converter, preferably for converting an electric or magnetic field or an electric current or a voltage into an actuating force.

In the context of the present invention, a torque damper device is understood to be a device for modifying vibration in said drive train, in particular in the region of the torque transmission device. A torque damper device for reducing vibration, in particular for eliminating vibration, is preferably provided at least in the region of said torque transmission device, preferably in the drive train.

A torque damper device preferably includes at least a damper input element and a damper output element. Said damper input element is preferably supported to be movable relative to said damper output element. In accordance with a further preferred feature, the relative movement between said damper input element and said damper output element modifies the frequency and/or the amplitude of a mechanical vibration present in said drive train. In accordance with a further preferred aspect, a torque damper device is embodied as a torsional vibration damper preferably for damping vibration due to friction, preferably by liquid friction, more preferably by dry friction.

In accordance with a further preferred feature, the torque damper device is embodied as a vibration isolator preferably for damping vibration due to the natural frequency of at least one mass-spring system. Said vibration isolator is preferably embodied as a mass-spring system having multiple masses that are capable of vibration, more preferably two masses capable of vibration, most preferably as a dual mass flywheel.

In accordance with a further preferred aspect, vibrations are actively damped in a torque damper device, preferably by a controllable actuator. A torque damper device for actively damping vibration preferably includes an electromechanical energy converter, preferably a piezoelectric device.

In accordance with a further preferred aspect, a torque damper device includes a device for modifying the damping behavior, preferably for modifying the natural frequency of a mass-spring system. This modification is preferably achieved at least partly as a function of the rotary speed of the torque damper device. In accordance with a further preferred aspect multiple torque damper devices, preferably devices operating in accordance with different principles of operation, preferably a mass-spring system and a frictional system, may be combined to form a new torque damper device.

In a torque damper device, the damper output element is preferably supported on the damper input element. Preferably a mounting by journal bearing is provided for this purpose. In accordance with a further preferred feature the damper output element is guided on a drive train shaft; preferably a rotationally fixed connection is provided as the bearing. In accordance with a further preferred aspect the damper output element is supported on a further component of the torque transmission device, preferably on a stationary housing portion; preferably a rolling bearing is provided for supporting the damper output element.

In the context of the present invention, "radially inside said rotor recess" is understood to mean that the torque transmission device does essentially not protrude from the rotor recess of said rotor device in a radial direction. Areas of the torque transmission device that are axially outside said rotor recess may preferably have a greater extension in the radial direction than the rotor recess. In accordance with a further preferred feature areas of the torque transmission device that are axially outside said rotor recess do not have any greater extension in the radial direction than said rotor recess.

In accordance with a preferred embodiment, in a torque transmission device, the torque transmission element and the torque damper device are axially spaced apart from each other. In this context, "axial" essentially refers to the extension in the direction of the axis of rotation of the torque transmission device. The torque transmission element and the torque damper device are preferably directly adjacent, i.e. there is preferably only a minimum or preferably no distance between them. Preferably, the transmission actuation device may not be arranged in the direct vicinity of the torque transmission element. In the context of the present invention, said torque transmission element and said torque damper device are even spaced apart from each other if the torque damper element is arranged axially between said torque transmission element and said transmission actuation device.

In accordance with a preferred embodiment the rotor recess partly or completely penetrates the rotor device along the axis of rotation in an axial direction, resulting in an open-edge recess having one or two openings. Said torque transmission element and the torque damper device are preferably arranged essentially inside said rotor recess in the axial direction. Said torque transmission device is preferably arranged essentially inside said rotor recess when the major part of the torque transmission device is arranged inside said rotor recess in the axial direction. It is preferred that only those components or portions of said torque transmission device that are provided to mount the torque transmission device and/or to transmit the torque to further components protrude beyond said rotor recess in the axial direction. This integration of the torque transmission device advantageously results in limited installation space requirements in the axial direction.

Figure 1A:
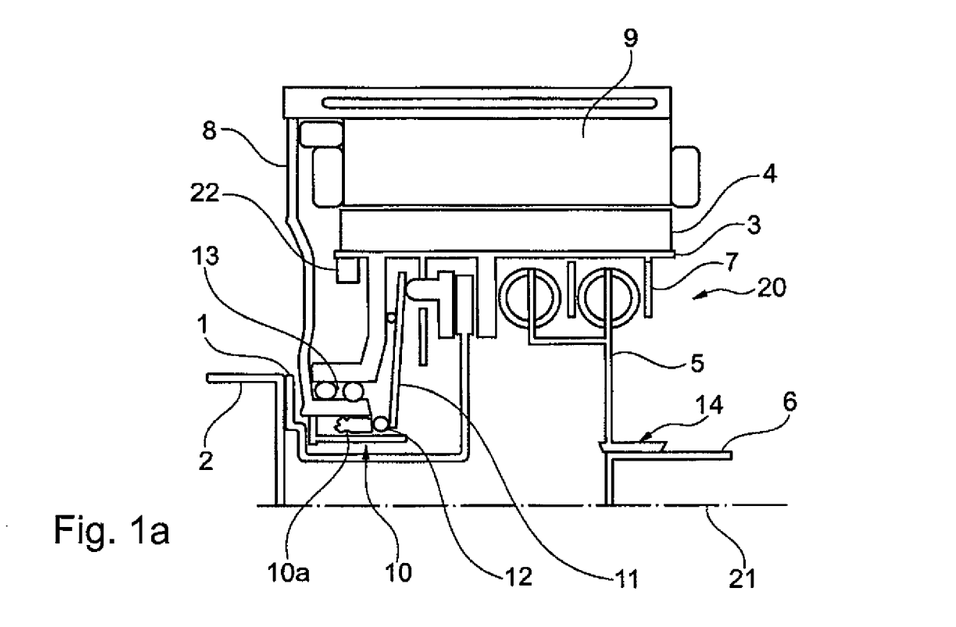
FIGS. 1a and 1b illustrate in FIG. 1a an exemplary embodiment of a torque transmission device and in FIG. 1b a further exemplary embodiment of a torque transmission device.
Figure 1B:
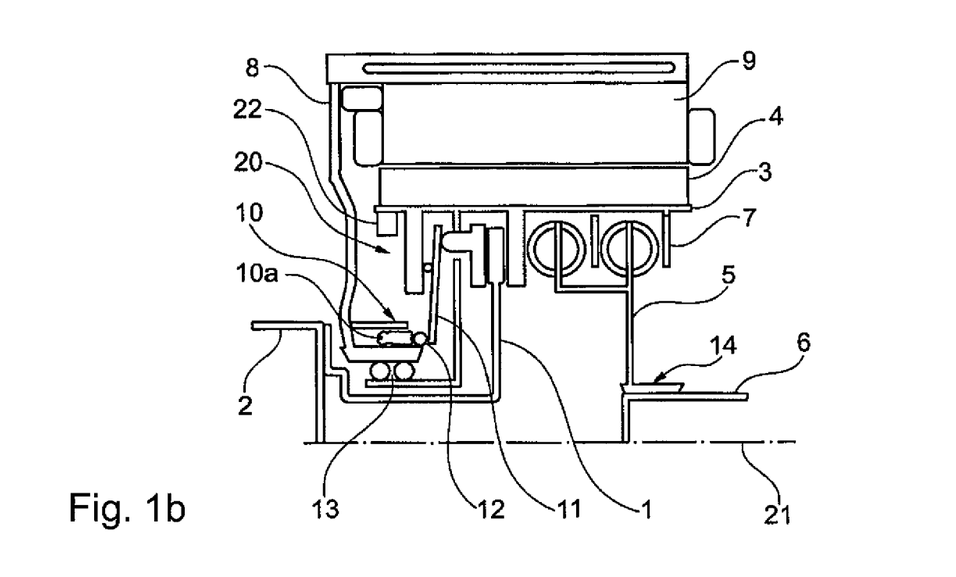

Variants 1, 2; FIGS. 1a and 1b

In accordance with a preferred embodiment, the transmission input element is coupled to the primary power take-off shaft, the transmission output element is coupled to the rotor device, and the damper output element is coupled to the drive train shaft. In accordance with a further preferred aspect, the damper input element and the transmission output element are coupled to each other.

The transmission output element is preferably supported for rotation in a housing portion that is stationary relative to said rotor device. In accordance with a preferred feature, a sensor device for taking measurements, in particular for measuring the rotary speed of the rotor device, may be arranged in the region of said stationary housing portion. In accordance with a further preferred aspect the transmission actuation device is arranged in a region of the torque transmission device that is essentially adjacent to the primary power take-off shaft or opposite the drive train shaft. A hydraulic cylinder, preferably a hydraulic cylinder including a circular ring surface is preferably provided as an element for generating the actuating force in said transmission actuation device. Said hydraulic cylinder is preferably also arranged in said stationary housing portion.

In accordance with a further preferred aspect the bearing location for mounting said transmission output element is arranged radially inside said transmission actuation device. In particular due to the arrangement of said bearing location radially inside said transmission actuation device a low-loss mounting is achieved. In accordance with a further preferred aspect, the bearing location for mounting said transmission output element is arranged radially outside said transmission actuation device. In particular due to the arrangement of said bearing location radially outside said transmission actuation device, a mounting with a high degree of stiffness is achieved. A rolling bearing is preferably provided to mount said transmission output element.

Said torque transmission element is preferably open in a state in which it is not actuated by said transmission actuation device. In this condition, the torque transmission element does not transmit torque. In this condition, a torque transmission element that is open when non-actuated only causes little loss. This design of a torque transmission element is used in particular when said clutch device is generally open during operation.

Said torque transmission element is preferably closed in a state in which it is not actuated by said transmission actuation device. Thus in this condition, the torque transmission element transmits torque. In this condition, a torque transmission element that is closed when non-actuated only causes little loss. This design of a torque transmission element is used in particular when it is generally closed during operation.

Said transmission input element is preferably coupled to said primary power take-off shaft in a form-locking, material-locking or force-locking way. Said damper input element is preferably coupled to said primary power take-off shaft by a releasable connection, preferably a screw connection, a splined connection, or a friction-locking connection. A simple mounting/dismounting of said torque transmission device may be achieved in particular by such a releasable connection. In accordance with a further preferred aspect said transmission input element is coupled to said primary power take-off shaft by a non-releasable connection, preferably a rivet or welding connection. A particularly simple mounting of the torque transmission device may be achieved by a non-releasable connection.

The torque transmission element is preferably embodied as a closed-loop-controllable clutch device, more preferably as a non-closed-loop-controllable clutch device. The use of a closed-loop-controllable device may in particular improve the comfort behavior (NVH) of the motor vehicle. The use of a non-closed-loop-controllable clutch device in particular allows a particularly simple and space-saving design of the torque transmission device.

Said damper output element is preferably coupled to said drive train shaft in a form-locking, material-locking, or force-locking way. In accordance with a further preferred aspect, said damper output element is preferably releasably coupled to said drive train shaft, preferably by a splined connection, a screw connection, or in a force-locking way, more preferably in a friction-locking way. In accordance with a further preferred aspect, said damper output element is connected to said drive train shaft by a non-releasable connection, preferably a rivet or welding connection. A non-releasable connection in particular results in a particularly simple mounting of the torque transmission device and in a space-saving design.

Said transmission output element is preferably coupled to said rotor device in a form-locking, material-locking, or force-locking way. In accordance with a further preferred aspect, said transmission output element is releasably coupled to said rotor device by a splined connection, a screw connection, or a rivet connection, or in a force-locking way, preferably by a friction-locking connection. Said transmission output element is preferably coupled to said rotor device by a non-releasable connection, in particular by a welding or rivet connection. A non-releasable, preferably material-locking connection in particular allows the transmission of high torques while requiring little installation space, attaining a reduced installation space requirement.

Said transmission output element is preferably coupled to said damper input element in a form-locking, material-locking, or force-locking way. Said transmission output element is preferably coupled to said damper input element by a releasable connection, preferably by a screw connection, a splined connection, or a friction-locking connection. A releasable connection may in particular result in a simple mounting/dismounting of said torque transmission device. In accordance with a further preferred feature, said transmission output element is coupled to said damper input element by a non-releasable connection, preferably a rivet or welding connection. A non-releasable connection in particular attains a space-saving design and the ability to transmit high torques.

Figure 2:
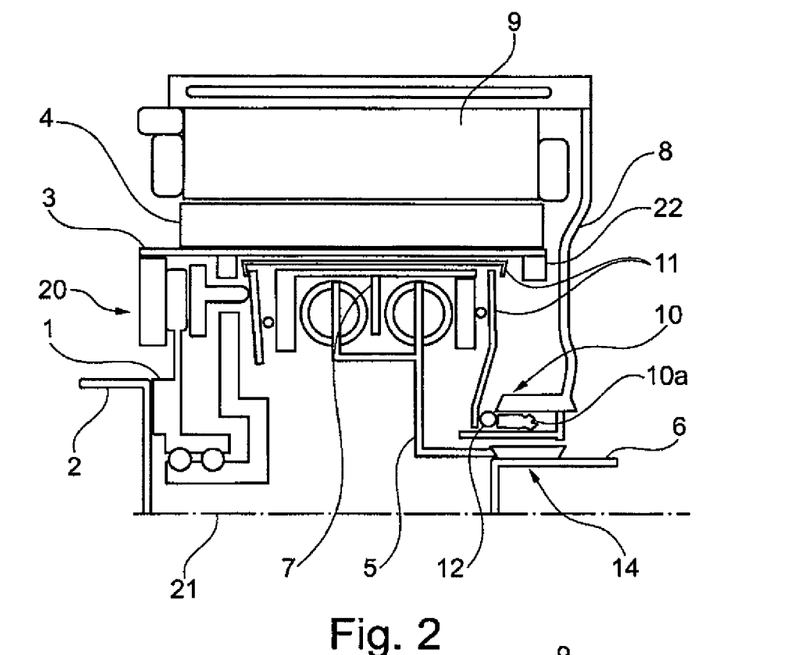
FIG. 2 illustrates a further exemplary embodiment of a torque transmission device.

Variant 3; FIG. 2

In accordance with a further preferred embodiment, the transmission input element is coupled to the primary power take-off shaft, the damper output element is coupled to the drive train shaft, and the transmission output element and/or said damper input element is coupled to the rotor device. Said transmission output element and said damper input element are preferably coupled to each other. The transmission actuation device is preferably arranged in a region of the torque transmission device that is located opposite the primary power take-off shaft or directly adjacent to the drive train shaft.

The transmission output element is preferably supported for rotation on said transmission input element. In accordance with a further preferred feature the transmission actuation device is arranged in a housing portion that is stationary relative to the rotor device. A sensor device for taking measurements, in particular for measuring the rotary speed of the rotor device, may be arranged in the region of said stationary housing portion.

Said transmission actuation device preferably includes a cylinder device for generating an actuating force. In accordance with a further preferred aspect, said cylinder device includes a piston in the shape of a circular ring. In accordance with a further preferred aspect, the actuating force is transmitted to said transmission output element or to said transmission input element by a mechanical device, in particular by a mechanical lever system.

In accordance with a further preferred aspect, like in the embodiment described above, said torque transmission element may be embodied as a closed-loop-controlled or non-closed-loop-controlled clutch device.

In accordance with a further preferred aspect, like in the embodiment described above, said torque transmission element may be embodied as a torque transmission element that is open or closed without the influence of an actuating force.

In accordance with a further preferred aspect, like in the embodiment described above, said transmission input element may be coupled to said primary power take-off shaft.

In accordance with a further preferred aspect, like in the embodiment described above, said damper output element may be coupled to said drive train shaft.

In accordance with a further preferred aspect, like in the embodiment described above, said transmission output element may be coupled to said rotor device.

In accordance with a further preferred aspect, like in the embodiment described above, said transmission output element may be coupled to said damper input element.

The fact that said transmission output element is mounted relative to said transmission input element as described above in particular results in a particularly small low-loss bearing.

Figure 3:
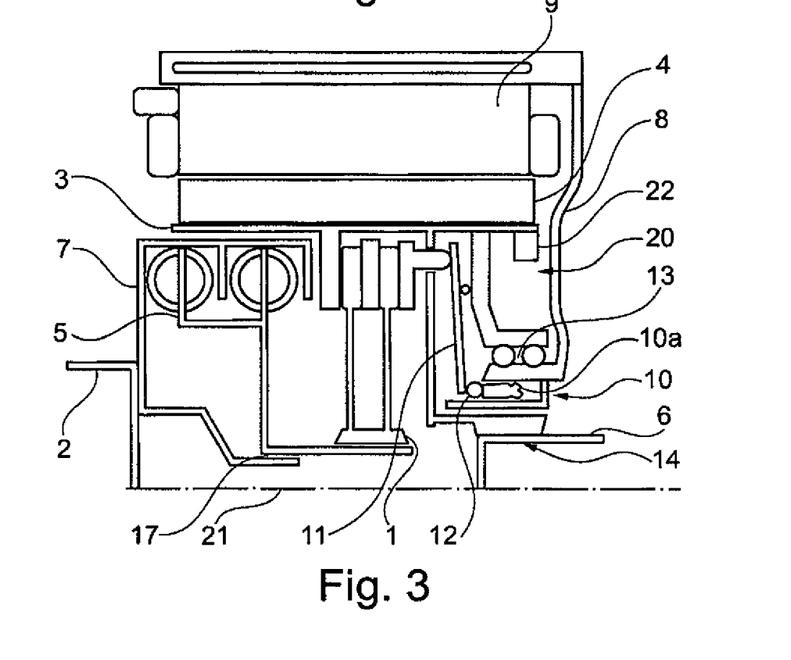
FIG. 3 illustrates a further exemplary embodiment of a torque transmission device.

Variant 4; FIG. 3

In accordance with a further preferred embodiment, the damper input element is coupled to the primary power take-off shaft, the transmission output element is coupled to the drive train shaft, and the transmission input element and/or said damper output element is coupled to the rotor device. In accordance with a further preferred aspect, the damper output element and the transmission input element are coupled to each other.

The transmission output element is preferably supported for rotation in a housing portion that is stationary relative to said rotor device. A sensor device for taking measurements, in particular for measuring the rotary speed of the rotor device, may be arranged in the region of said stationary housing portion. In accordance with a further preferred aspect, the transmission actuation device is arranged in a region of the torque transmission device that is preferably located essentially in a region facing away from the primary power take-off shaft or in a region adjacent to the drive train shaft. A hydraulic cylinder, preferably a hydraulic cylinder including a circular ring surface is preferably provided as an element for generating the actuating force for said transmission actuation device. Said transmission actuation device is preferably also arranged in said stationary housing portion.

In accordance with a further preferred aspect, the bearing location for mounting said transmission output element is arranged radially inside said transmission actuation device. This arrangement may in particular represent a space-saving and in particular a low-loss mounting.

In accordance with a further preferred aspect, the bearing location for mounting said transmission output element is arranged radially outside said transmission actuation device. This arrangement may in particular represent a high-stiffness bearing. Preferably a rolling bearing is provided to mount said transmission output element.

In accordance with a further preferred aspect, like in the embodiment described above, said torque transmission element may be embodied as a closed-loop-controlled or non-closed-loop-controlled clutch device.

In accordance with a further preferred aspect, like in the embodiment described above, said torque transmission element may be embodied as a torque transmission device that is open without the influence of an actuating force or as a torque transmission device that is closed without the influence of an actuating force.

Said damper input element is preferably coupled to said primary power take-off shaft in a form-locking, material-locking, or force-locking way. Said damper input element is preferably coupled to said primary power take-off shaft by a releasable connection, preferably a screw connection, a splined connection, or a friction-locking connection. A simple mounting/dismounting of said torque transmission device may be achieved in particular by a releasable connection. In accordance with a further preferred aspect said damper input element is coupled to said primary power take-off shaft by a non-releasable connection, preferably a rivet or welding connection. A particularly simple mounting of the torque transmission device and a space-saving design may be achieved in particular by a non-releasable connection.

Said transmission output element is preferably coupled to said drive train shaft in a form-locking, material-locking, or force-locking way. Said transmission output element is preferably coupled to said drive train shaft by a releasable connection, preferably a screw connection, a splined connection, or a form-locking connection, preferably a friction-locking connection. A simple mounting/dismounting of said torque transmission device may be achieved in particular by a releasable connection. In accordance with a further preferred aspect said transmission output element is coupled to said drive train shaft by a non-releasable connection, preferably a rivet or welding connection. A particularly simple mounting of the torque transmission device and a space-saving design may in particular be achieved by a non-releasable connection.

In accordance with a further preferred aspect, like in the embodiment described above, said transmission output element may be coupled to said rotor device.

Said damper output element is preferably coupled to said transmission input element in a form-locking, material-locking, or force-locking way. Said damper output element is preferably coupled to said transmission input element by a releasable connection, preferably a screw connection, a splined connection, or a friction-locking connection. A simple mounting/dismounting of said torque transmission device may be achieved in particular by a releasable connection. In accordance with a further preferred aspect said damper output element is coupled to said transmission input element by a non-releasable connection, preferably a rivet or welding connection. A space-saving design that allows the transmission of high torques is attained in particular by a non-releasable connection.

Figure 4:
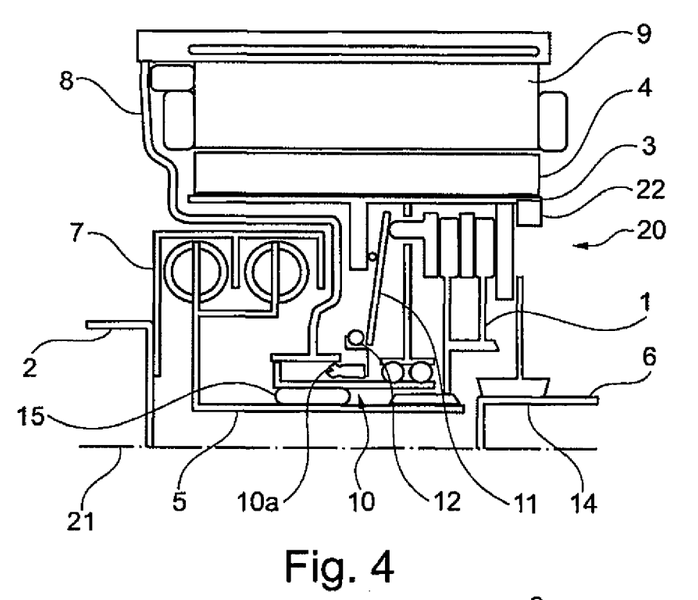
FIG. 4 illustrates a further exemplary embodiment of a torque transmission device.

Variant 5; FIG. 4

In accordance with a further preferred embodiment, said damper input element is coupled to said primary power take-off shaft, and the transmission output element is coupled to the drive train shaft and to the rotor device. In accordance with a further preferred aspect, the damper output element and the transmission input element are coupled to each other.

In accordance with a further preferred aspect, the transmission actuation device is arranged in a region of the torque transmission device that is essentially located between said torque damper device and said torque transmission element. A hydraulic cylinder, preferably a hydraulic cylinder including a circular ring surface is preferably provided as an element for generating an actuating force for said transmission actuation device. The transmission actuation device is preferably arranged in a housing portion that is stationary relative to the rotor device.

A sensor device for taking measurements, in particular for measuring the rotary speed of the rotor device, may preferably be arranged in the region of said stationary housing portion.

The damper output element is preferably supported for rotation in said housing portion that is stationary relative to said rotor device. In accordance with a further preferred aspect, the bearing location for mounting said damper output element is arranged radially inside said transmission actuation device. The arrangement of said bearing location radially inside said transmission actuation device in particular achieves a low-loss bearing.

In accordance with a further preferred aspect, the bearing location for mounting said damper output element is arranged radially outside said transmission actuation device. The arrangement of said bearing location radially outside said transmission actuation device in particular achieves a high-stiffness bearing. A rolling bearing is preferably provided to mount said transmission output element.

In accordance with a further preferred embodiment, like in the embodiment described above, said torque transmission element may be embodied as a closed-loop-controlled clutch device or as a non-closed-loop-controlled clutch device.

In accordance with a further preferred aspect, like in the embodiment described above, said torque transmission element may be embodied as a torque transmission element that is open without the influence of an actuating force or as a torque transmission element that is closed without the influence of an actuating force.

Like in the embodiment described above, the damper input element is coupled to the primary power take-off shaft.

Like in the embodiment described above, the transmission output element is preferably coupled to the drive train shaft.

Like in the embodiment described above, the transmission output element is preferably coupled to the rotor device.

Like in the embodiment described above, the damper output element is preferably coupled to the transmission input element.

Figure 5:
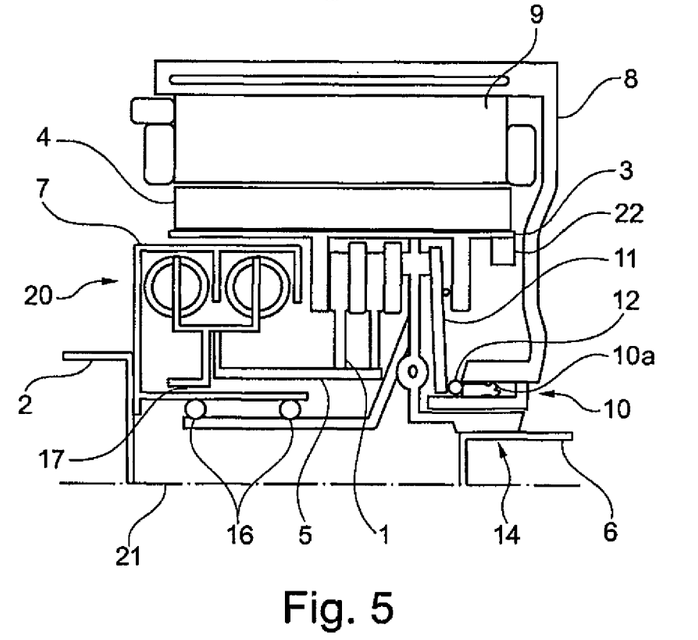
FIG. 5 illustrates a further exemplary embodiment of a torque transmission device.

Variant 6; FIG. 5

In accordance with a further preferred embodiment, the damper input element and the primary power take-off shaft are coupled to each other, and the transmission output element is coupled to the drive train shaft and to the rotor device. In accordance with a further preferred aspect, the damper output element and the transmission input element are coupled to each other.

In accordance with a further preferred aspect, the transmission actuation device is arranged in a region of the torque transmission device that is essentially located in a region that is located opposite said primary power take-off shaft or adjacent to the drive train shaft. A hydraulic cylinder, preferably a hydraulic cylinder including a circular ring surface, is preferably provided as an element for generating an actuating force in said transmission actuation device. The transmission actuation device is preferably arranged in a housing portion that is stationary relative to the rotor device.

A sensor device for taking measurements, in particular for measuring the rotary speed of the rotor device, may be arranged in the region of said stationary housing portion.

The transmission output element is preferably supported for rotation on the damper input element, preferably by a rolling bearing. The arrangement of said transmission input element opposite, preferably on said damper input element achieves a high degree of accuracy in the coaxial alignment of these two elements relative to each other and thus in particular a simple mounting of the torque transmission device. A rolling bearing is preferably provided to mount said transmission output element.

In accordance with a further preferred aspect, like in the embodiment described above, said torque transmission device may be embodied as a closed-loop-controlled clutch device or as a non-closed-loop-controlled clutch device.

In accordance with a further preferred aspect, like in the embodiment described above, said torque transmission device may be embodied as a torque transmission device that is open without the influence of an actuating force or as a torque transmission device that is closed without the influence of an actuating force.

Like in the embodiment described above, the damper input element is preferably coupled to the primary power take-off shaft.

Like in the embodiment described above, the transmission output element is preferably coupled to the drive train shaft.

Like in the embodiment described above, the transmission output element is preferably coupled to the rotor device.

Like in the embodiment described above, the damper output element is preferably coupled to the transmission input element.

Figure 6A:
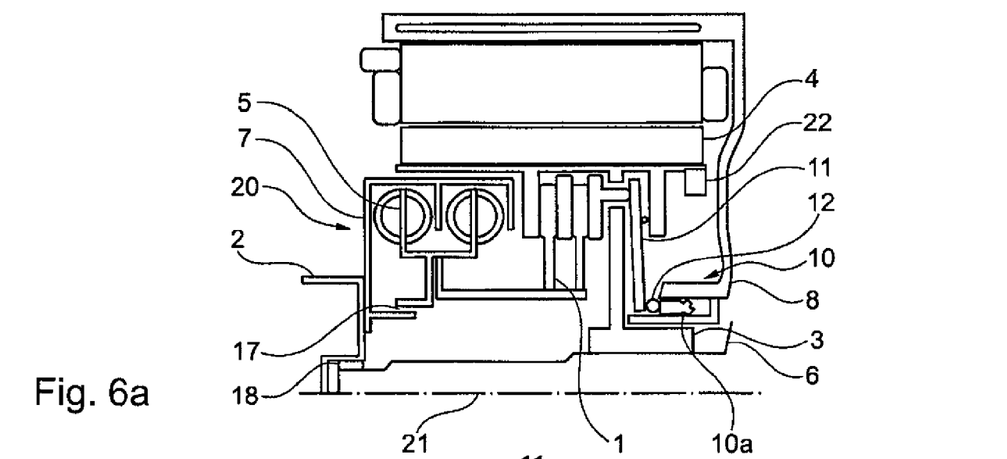
Figure 6B:
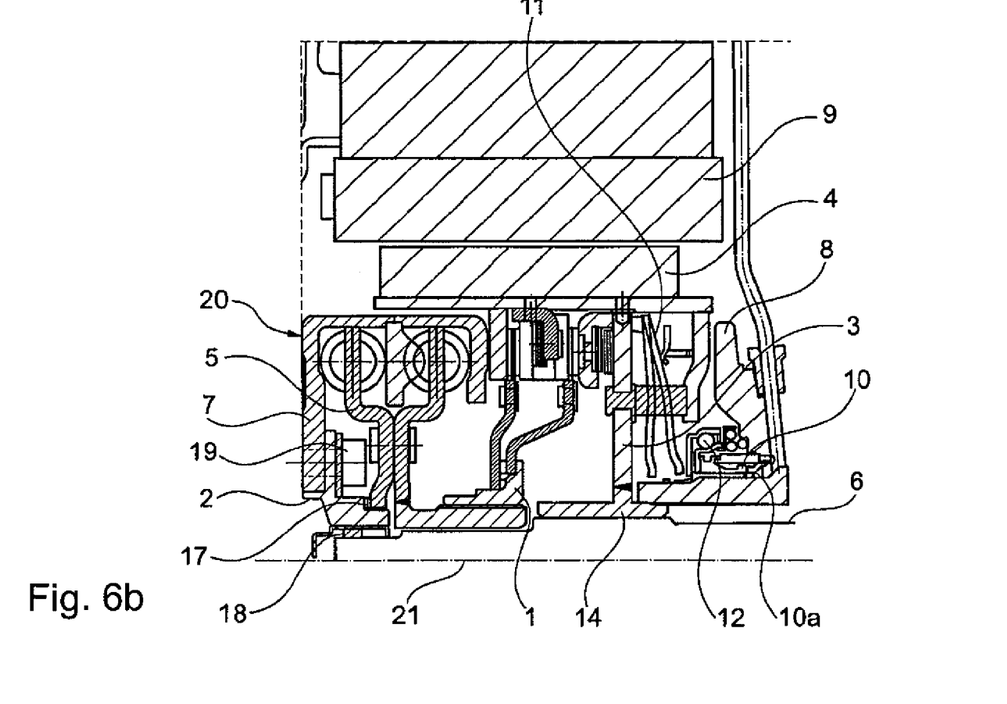

Variant 7; FIGS. 6a and 6b

In accordance with a further preferred embodiment, the damper input element is coupled to the primary power take-off shaft, the transmission output element is coupled to the drive train shaft, and the transmission output element is coupled to the rotor device. In accordance with a further preferred aspect, the damper output element and the transmission input element are coupled to each other. The damper output element is preferably supported on the damper input element, preferably by a journal bearing. In particular due to the contact, preferably a friction-locking contact, an additional damping effect and thus an improved torque transmission behavior are attained.

In accordance with a further preferred aspect, the transmission actuation device is arranged in a region of the torque transmission device that is essentially located in a region that is located opposite to said primary power take-off shaft or adjacent to the drive train shaft. A hydraulic cylinder, preferably a hydraulic cylinder including a circular ring surface, is preferably provided as an element for generating the actuating force in said transmission actuation device. The transmission actuation device is preferably arranged in a housing portion that is stationary relative to the rotor device.

A sensor device for taking measurements, in particular for measuring the rotary speed of the rotor device, may preferably be arranged in the region of said stationary housing portion.

In accordance with a further preferred aspect, the drive trains shaft is supported on said primary power take-off shaft, preferably by a rolling bearing, more preferably by what is known as a pilot bearing. In accordance with a further preferred aspect, the drive train shaft is not supported on the primary power take-off shaft. In particular by integrating said bearing in the primary power take-off shaft, a particularly space-saving design of the torque transmission device is achieved. By dispensing with the bearing, the number of components may preferably be reduced and in particular the number of bearing locations may be reduced by one, representing an improved torque transmission device.

In accordance with a further preferred aspect, like in the embodiment described above, said torque transmission element may be embodied as a closed-loop-controlled clutch device or as a non-closed-loop-controlled clutch device.

In accordance with a further preferred aspect, like in the embodiment described above, said torque transmission element may be embodied as a torque transmission element that is open without the influence of an actuating force or as a torque transmission element that is closed without the influence of an actuating force.

Like in the embodiment described above, the damper input element is preferably coupled to the primary power take-off shaft.

Like in the embodiment described above, the transmission output element is preferably coupled to the drive train shaft.

Like in the embodiment described above, the transmission output element is preferably coupled to the rotor device.

Like in the embodiment described above, the damper output element is preferably coupled to the transmission input element.

Figure 7A:
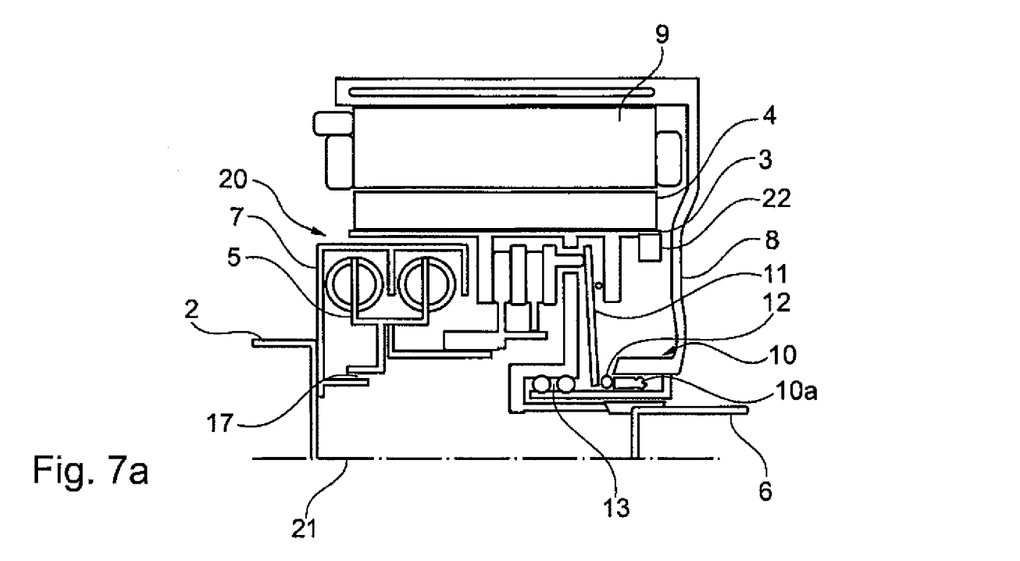
Figure 7B:
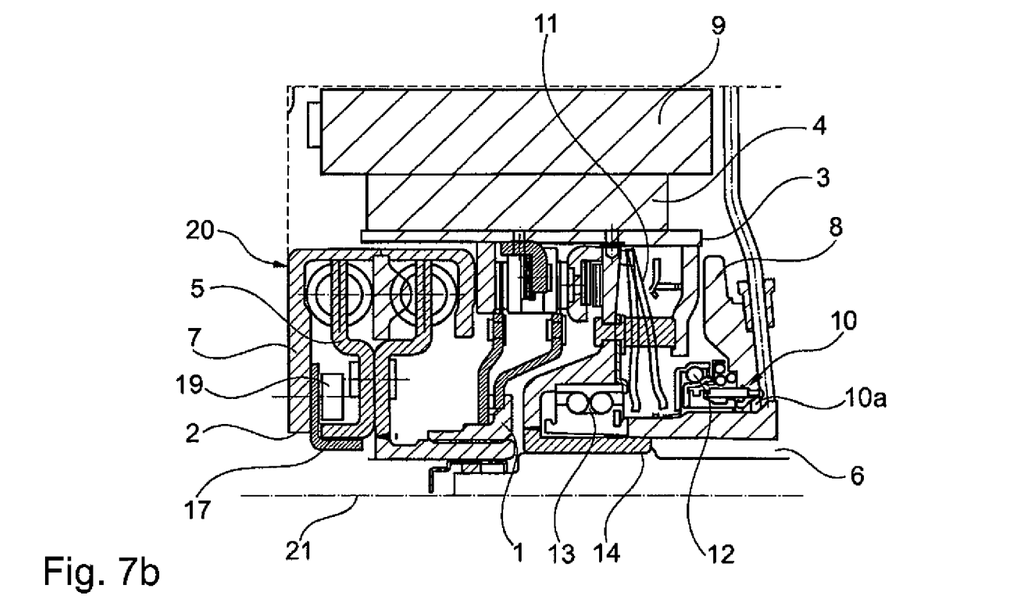

Variant 8, FIGS. 7a and 7b

In accordance with a further preferred embodiment, the damper input element is coupled to the primary power take-off shaft; the transmission output element is coupled to the drive train shaft and to the rotor device. In accordance with a further preferred aspect, the damper output element and the transmission input element are coupled to each other. In accordance with a further preferred aspect, the damper output element contacts the damper input element, in particular in a friction-fitting way. The damper output element is preferably supported on the damper input element, preferably by a journal bearing. In particular due to the contact, which is prefer-ably a friction-fitting contact, an additional damping effect and thus an improved torque transmission behavior are attained.

In accordance with a further preferred aspect, the transmission actuation device is arranged in a region of the torque transmission device that is essentially located in a region that is located opposite said primary or adjacent to the drive train shaft. A hydraulic cylinder, preferably a hydraulic cylinder including a circular ring surface, is preferably provided as an element for generating the actuating force in said transmission actuation device. The transmission actuation device is preferably arranged in a housing portion that is stationary relative to the rotor device.

A sensor device for taking measurements, in particular for measuring the rotary speed of the rotor device, may preferably be arranged in the region of said stationary housing portion.

The transmission output element is preferably supported on said stationary housing portion. A rolling bearing is preferably provided to support the transmission output element on said stationary housing portion. The bearing location of the transmission output element is preferably axially spaced-apart from the transmission actuation device. These two bearing locations preferably have essentially the same diameter. This design of the bearing locations in particular allows them to be designed for high rotary speeds. In accordance with a further preferred aspect, these two bearing locations may not be axially spaced apart from each other. In accordance with a further preferred aspect, the bearing locations may have different diameters. The fact that the bearing locations have different diameters and are in particular not spaced apart favors a particularly space-saving design of the torque transmission device.

In accordance with a further preferred aspect, like in the embodiment described above, said torque transmission element may be embodied as a closed-loop-controlled clutch device or as a non-closed-loop-controlled clutch device.

In accordance with a further preferred aspect, like in the embodiment described above, said torque transmission element may be embodied as a torque transmission element that is open without the influence of an actuating force or as a torque transmission element that is closed without the influence of an actuating force.

Like in the embodiment described above, the damper input element is preferably coupled to the primary take-off shaft.

Like in the embodiment described above, the transmission output element is preferably coupled to the drive train shaft.

Like in the embodiment described above, the transmission output element is preferably coupled to the rotor device.

Like in the embodiment described above, the damper output element is preferably coupled to the transmission input element.

BRIEF DESCRIPTION OF THE DRAWINGS

Further advantages, features and applications of the present invention will become apparent from the following description in connection with the figures. It is to be understood that individual features of these exemplary embodiments may be combined.

FIGS. 6a and 6b illustrate in FIG. 6a a further exemplary embodiment of a torque transmission device and in FIG. 6b a more detailed view of the exemplary embodiment shown in FIG. 6a.

FIGS. 7a and 7b illustrate in FIG. 7a a further exemplary embodiment of a torque transmission device and in 7b a more detailed view of the exemplary embodiment shown in FIG. 7a.

DETAILED DESCRIPTION

FIGS. 1a and 1b illustrate different exemplary embodiments of a torque transmission device. In the embodiments shown in FIGS. 1a and 1b, the transmission input element 1 is coupled to the primary power take-off shaft 2, the transmission output element 3 is coupled to the rotor device 4, and the damper output element 5 is coupled to the drive train shaft 6. In addition, the damper input element 7 and the transmission output element 3 are coupled to each other. The torque transmission device is essentially arranged inside a rotor recess 20, and the rotor device 4 is supported for rotation about its axis of rotation 21.

The transmission output element 3 is supported for rotation in a housing portion 8 that is stationary relative to said rotor device 4. In the region of the stationary housing portion 8, a sensor device 22 is provided to record the rotary speed of the rotor device. Said rotor device 4 is supported for rotation in a stator device 9. The transmission actuation device 10 is arranged in a region of the torque transmission device that is adjacent to the primary power take-off shaft 2 or opposite the drive train shaft 6. A hydraulic cylinder having a circular ring surface is provided to generate the actuating force in said transmission actuation device 10. Said hydraulic cylinder is arranged in the same stationary housing portion 8. The forces of the transmission actuation device 10 are transmitted to the transmission output element 3 by a mechanical lever system. A rolling bearing device 12 is arranged between said mechanical lever system 11 and said transmission actuation device 10 in particular to maintain losses on a low level.

In FIG. 1a, the bearing location for supporting said transmission output element 3 is arranged radially outside said transmission actuation device 10. The bearing is a rolling bearing 13.

In FIG. 1b, the bearing location for supporting said transmission output element 3 is arranged radially inside said transmission actuation device 10. The bearing is a rolling bearing 13.

In both exemplary embodiments of FIGS. 1a and 1b, the torque transmission device is closed and thus transmits torque when it is not actuated by the transmission actuation device 10. The transmission input element 1 and the transmission output element 3 contact one another to transmit torque.

Said transmission input element 1 is coupled to said primary power take-off shaft 2 in a form-locking way by a screw connection.

The torque transmission element is embodied as a closed-loop-controlled clutch device; such clutch devices are commonly known as HALDEX clutches.

Said damper output element 5 is coupled to said drive train shaft 6 by a shaft/hub connection, in the present example an internal/external spline. Thus said damper output element 5 is releasably coupled to said drive train shaft 6.

Said transmission output element 3 is coupled to said rotor device 4 in a force-locking way, in the given example by a shrink fit.

Said transmission output element 3 is coupled to the damper input element 7 in a form-locking way, here by a shaft-hub connection embodied as an internal/external spline.

FIG. 2 illustrates a further embodiment of a torque transmission device. Here, the transmission input element 1 is coupled to the primary power take-off shaft 2, the damper output element 5 is coupled to the drive train shaft 6, and the transmission output element 3 is coupled to the rotor device 4. Said rotor device 4 is supported for rotation in a stator device 9. Furthermore said transmission output element 3 and said damper input element 7 are coupled to each other. The transmission actuation device 10 is arranged in a region of the torque transmission device that is located opposite the primary power take-off shaft 2 or directly adjacent to the drive train shaft 6. The torque transmission device is essentially arranged inside a rotor recess 20, and the rotor device 4 is supported for rotation about its axis of rotation 21.

Said transmission output element 3 is supported for rotation on said transmission input element 1. The transmission actuation device 10 is arranged in a housing portion 8 that is stationary relative to the rotor device 4. A sensor device 22 for recording the rotary speed of the rotor device is arranged in the region of the stationary housing portion 8. Said transmission actuation device 10 includes a cylinder device for generating an actuating force. Said cylinder device 10a includes a piston shaped like a circular ring. The actuating force is transmitted to said transmission output element 3 by a mechanical lever system 11. A rolling bearing device 12 is arranged between said mechanical lever system 11 and said transmission actuation device 10, in particular to maintain the power loss on a low level.

In the non-actuated state, the torque transmission element is closed. The torque transmission element is embodied as a non-closed-loop-controlled clutch device.

In this exemplary embodiment, too, the transmission input element 1 is coupled to said primary power take-off shaft 2 by a screw connection.

Said damper output element 5 is coupled to the drive train shaft 6 by a shaft-hub connection 14, here an internal/external spline.

Said transmission output element 3 is likewise coupled to said rotor device 4 by a shaft-hub connection, here an internal/external spline.

Said transmission output element 3 is coupled to said damper input element 7 by a shaft-hub connection, here an internal/external spline.

FIG. 3 illustrates an exemplary embodiment of a torque transmission device wherein the damper input element 7 is coupled to the primary power take-off shaft 2, the transmission output element 3 is coupled to the drive train shaft 6, and the transmission input element 1 is coupled to the rotor device. Said rotor device 4 is supported for rotation in a stator device 9. The damper output element 5 and the transmission input element 1 are coupled to each other. The torque transmission device is essentially arranged inside a rotor recess 20 and the rotor device 4 is supported for rotation about its axis of rotation 21.

The transmission output element 3 is supported for rotation in a housing portion 8 that is stationary relative to said rotor device 4. A sensor device 22 for recording the rotary speed of the rotor device is arranged in the region of the stationary housing portion. The transmission actuation device 10 is arranged in a region of the torque transmission device that is essentially located in a region facing away from the primary power take-off shaft 2 or adjacent to the drive train shaft 6.

A hydraulic cylinder 10a, here a hydraulic cylinder having a circular ring surface, is provided to generate the actuating force for said transmission actuation device 10. Said transmission actuation device 10 is likewise arranged in said stationary housing portion 8. The actuating forces of said transmission actuation device 10 are transmitted to said transmission output element 3 by a mechanical lever system 11. A rolling bearing device 12 is arranged between said mechanical lever system 11 and said transmission actuation device 10, in particular to maintain the power loss on a low level.

The bearing location 13 for supporting said transmission output element is arranged radially outside said transmission actuation device 10, attaining a high degree of stiffness and a high load-bearing capacity of said bearing.

Said torque transmission element is embodied as a closed-loop-controlled clutch device, which is in particular known as a HALDEX clutch device.

Said torque transmission element is embodied as a torque transmission element that is open without the influence of an actuating force.

Said damper input element 7 is coupled to said primary power take-off shaft 2 in a form-locking way, in particular by a screw connection with multiple screw devices.

Said transmission output element 3 is coupled to said drive train shaft 6 in a form-locking way, in particular by a shaft-hub connection embodied as an internal/external spline 14.

Said transmission output element 3 is coupled to said rotor device 4 in a material-locking way, in particular by a welding connection.

Said damper output element 5 is coupled to said transmission input element 1 in a form-locking way, here in particular by a shaft-hub connection embodied as an internal/external spline. Said damper output element 5 is supported on the damper input element 7. In the illustrated example, a journal bearing 17 is provided, in particular to allow additional vibration damping.

FIG. 4 illustrates an exemplary embodiment of a torque transmission device wherein the damper input element 7 is coupled to the primary power take-off shaft 2 and the transmission output element 3 is coupled to the drive train shaft 6 and to the rotor device 4. Said rotor device 4 is supported for rotation in a stator device 9. The damper output element 5 and the transmission input element 1 are coupled to each other. The torque transmission device is essentially arranged inside a rotor recess 20, and the rotor device 4 is supported for rotation about its axis of rotation 21.

The transmission actuation device 10 is arranged in a region of the torque transmission device that is essentially located between said torque damper device and said torque transmission element. A hydraulic cylinder 10a, in the illustrated example a hydraulic cylinder having a circular ring surface, is provided to generate the actuating force for said transmission actuation device 10. The transmission actuation device 10 is preferably arranged in a housing portion 8 that is stationary relative to the rotor device. A sensor device 22 for recording the rotary speed of the rotor device is arranged in the region of the stationary housing portion 8. The actuating forces of said transmission actuation device 10 are transmitted to said transmission output element 3 by a mechanical lever system 11. A rolling bearing device 12 is arranged between said mechanical lever system 11 and said transmission actuation device 10, in particular to maintain the power loss on a low level.

The damper output element 5 is supported for rotation in said housing portion 8 that is stationary relative to said rotor device 4. The bearing location 15 for supporting said damper output element 5 is arranged radially inside said transmission actuation device 10. The arrangement of said bearing location 15 radially inside said transmission actuation device 10 in particular attains a low-loss small-diameter bearing.

Said torque transmission element is embodied as a non-controllable clutch device. Said torque transmission element is embodied as a torque transmission element that is closed without the influence of an actuating force.

The damper input element 7 is coupled to the primary power take-off shaft 2 by a releasable connection, in the present case a screw connection.

The transmission output element 3 is coupled to the drive train shaft 6 by a shaft-hub connection, which is embodied as an internal/external spline 14 in the illustrated example.

The transmission output element 3 is coupled to the rotor device by a form-locking connection, in the illustrated example by a shaft-hub connection embodied as an internal/external spline.

The damper output element 5 is preferably coupled to the transmission input element 1 by a shaft-hub connection, which is embodied as an internal/external spline in the illustrated example.

FIG. 5 illustrates an exemplary embodiment of a torque transmission device wherein the damper input element 7 is coupled to the primary power take-off shaft 2 and the transmission output element 3 is coupled to the drive train shaft 6 and to the rotor device 4. Said rotor device 4 is supported for rotation in a stator device 9. The damper output element 5 and the transmission input element 1 are coupled to each other. The torque transmission device is essentially arranged inside a rotor recess 20 and the rotor device 4 is supported for rotation about its axis of rotation 21.

The transmission actuation device 10 is arranged in a region of the torque transmission device that is essentially located in a region located opposite the primary power take-off shaft 2, i.e. adjacent to the drive train shaft 6. A hydraulic cylinder 10a, in the illustrated example a hydraulic cylinder having a circular ring surface, is provided in said transmission actuation device 10 to generate the actuating force. The transmission actuation device 10 is arranged in a housing portion 8 that is stationary relative to the rotor device 4. A sensor device 22 for recording the rotary speed of the rotor device is arranged in the region of the stationary housing portion 8. The actuating forces of said transmission actuation device 10 are transmitted to said transmission output element 3 by a mechanical lever system 11. A rolling bearing device 12 is arranged between said mechanical lever system 11 and said transmission actuation device 10, in particular to maintain the power loss on a low level.

The transmission output element 3 is supported for rotation on the damper input element 7, in the illustrated example by a rolling bearing 16.

The torque transmission element is embodied as a non-controllable clutch device. Said torque transmission element is embodied as a torque transmission element that is closed without the influence of an actuating force.

The damper output element 7 is coupled to the primary power take-of shaft 2, in the illustrated example by a form-locking connection, in particular a screw connection.

The transmission output element 3 is coupled to the drive train shaft 6, in the illustrated example by a form-locking connection embodied as an internal/external spline 14.

The transmission output element 3 is coupled to the rotor device 4, in the illustrated example by a form-locking connection.

The damper output element 5 is coupled to the transmission input element 1 by a form-locking connection, in the illustrated example by a shaft-hub connection embodied as an internal/external spline. The damper output element 5 is supported on the damper input element 7, in the illustrated example by a journal bearing 17, in particular to provide additional vibration damping.

FIGS. 6a and 6b illustrate a further exemplary embodiment of a torque transmission device, with FIG. 6b being a more detailed view of the exemplary embodiment shown in FIG. 6a. In this embodiment, the damper input element 7 is coupled to the primary power take-off shaft 2, the transmission output element 3 is coupled to the drive train shaft 6, and the transmission output element 3 is coupled to the rotor device. Said rotor device 4 is supported for rotation in a stator device 9. The damper output element 5 and the transmission input element 1 are coupled to each other. The damper output element 5 is supported on the damper input element 1, in the illustrated example by a journal bearing 17, in particular to allow additional vibration damping. The torque transmission device is arranged essentially inside a rotor recess 20, and the rotor device 4 is supported for rotation about its axis of rotation 21.

The transmission actuation device 10 is arranged in a region of the torque transmission device that is essentially located in a region located opposite the primary power take-off shaft 2 or adjacent to the drive train shaft 6. A hydraulic cylinder 10a, in the illustrated example a hydraulic cylinder 10a having a circular ring surface, is provided to generate the actuating force in said transmission actuation device 10. The transmission actuation device 10 is arranged in a housing portion 8 that is stationary relative to the rotor device 4. A sensor device 22 for recording the rotary speed of the rotor device is arranged in the region of the stationary housing portion 8. The actuating forces of said transmission actuation device 10 are transmitted to said transmission output element 3 by a mechanical lever system 11. A rolling bearing device 12 is arranged between said mechanical lever system 11 and said transmission actuation device 10, in particular to maintain the power loss on a low level.

The drive train shaft 6 is supported on said primary power take-off shaft 2. A rolling bearing 18 is provided to support said drive train shaft 6 on said primary power take-off shaft 2. The integration of said bearing into the primary power take-off shaft 2 in particular may attain a particularly space-saving design of the torque transmission device.

Said torque transmission element is embodied as a non-controllable clutch device.

Said torque transmission element is open without the influence of an actuating force.

The damper input element 7 is coupled to the primary power take-off shaft 2, in the illustrated example by a releasable connection, in particular a screw connection 19 having multiple screws.

The transmission output element 3 is coupled to the drive train shaft 6, in the illustrated example by a shaft-hub connection embodied as an internal/external spline 14.

The transmission output element 3 is coupled to the rotor device 4, in the illustrated example by a form-locking connection, in particular a pressure fit.

The damper output element 5 is coupled to the transmission input element 1, in the illustrated example by a shaft-hub connection embodied as an internal/external spline.

FIGS. 7a and 7b illustrate a further exemplary embodiment of a torque transmission device, with FIG. 7b being a more detailed view of the exemplary embodiment shown in FIG. 7a. In this embodiment, the damper input element 7 is coupled to the primary power take-off shaft 2; the transmission output element 3 is coupled to the drive train shaft 6 and to the rotor device. Said rotor device 4 is supported for rotation in a stator device 9. The damper output element 5 and the transmission input element 1 are coupled to each other. The damper output element 5 contacts the damper input element 7 in a friction-locking way. The damper output element 5 is supported on the damper input element 7, in the illustrated example by a journal bearing 17. In particular, the contact, preferably the friction-fitting contact, results in an additional damping effect and thus in an improved torque transmission behavior. The torque transmission device is arranged essentially inside a rotor recess 20, and the rotor device 4 is supported for rotation about its axis of rotation 21.

The transmission actuation device 10 is arranged in a region of the torque transmission device that is essentially located in a region located opposite the primary power-take-off shaft or adjacent to the drive train shaft 6. A hydraulic cylinder 10a, in the illustrated example a hydraulic cylinder 10a having a circular ring surface, is provided to generate the actuating force in said transmission actuation device 10. The transmission actuation device is arranged in a housing portion 8 that is stationary relative to the rotor device 4. A sensor device 22 for recording the rotary speed of the rotor device is arranged in the region of the stationary housing portion 8. The actuating forces of the transmission actuation device 10 are transmitted to said transmission output element 3 by a mechanical lever system 11. A rolling bearing device 12 is arranged between said mechanical lever system 11 and said transmission actuation device 10, in particular to maintain the power loss on a low level.

The transmission output element 3 is supported on said stationary housing portion 8. A rolling bearing 13 is provided to support the transmission output element 3 on said stationary housing portion 8. The bearing location of the transmission output element is axially spaced apart from the transmission actuation device. This axial spacing favors a particularly space-saving design of the torque transmission device.

Said torque transmission element is embodied as a non-controllable clutch device.

Said torque transmission element is embodied as a torque transmission device that is open without the influence of an actuating force.

The damper input element 7 is coupled to the primary power take-of shaft 2, in the illustrated example by a releasable connection, in particular a screw connection 19 including multiple screw devices.

The transmission output element 3 is coupled to the drive train shaft 6, in the illustrated example by a form-locking connection 14, in particular a shaft-hub connection embodied as an internal/external spline.

The transmission output element 3 is coupled to the rotor device 4, in the illustrated example by a material-locking connection, in particular an adhesive connection The damper output element 5 is coupled to the transmission input element 1, in the illustrated example by a shaft-hub connection embodied as an internal/external spline.

What is claimed is:

1. A torque transmission device for a drive train of a motor vehicle, the drive train further including a primary driving engine having a primary power take-off shaft, a secondary driving engine, and a drive train shaft, the torque transmission device comprising:

at least one torque transmission element; and
a torque damper device,
the at least one torque transmission element including a transmission input element, a transmission output element, and a transmission actuation device and the torque damper device including a damper input element and a damper output element, the damper output element being supported on the damper input element, the secondary driving engine including a stator device and a rotor device arranged in the stator device to rotate about an axis of rotation, the rotor device including a rotor recess, the torque damper device and the torque transmission element being arranged radially inside the rotor recess.

2. The torque transmission device recited in claim 1 wherein the torque transmission element and the torque damper device are axially spaced apart from each other.

3. The torque transmission device recited in claim 1 wherein the rotor recess partly or completely penetrates the rotor device along the axis of rotation in the axial direction, and
wherein the torque transmission element and the torque damper device are arranged inside said rotor recess in the axial direction.

4. The torque transmission device recited in claim 1 wherein the damper input element is coupled to the primary power take-off shaft, wherein the transmission input element and the damper output element are coupled to each other, and wherein said transmission output element is coupled to said drive train shaft, and wherein the transmission output element is coupled to the rotor device, and wherein said transmission output element is supported in a housing portion stationary relative to the rotor device, and wherein the transmission actuation device is arranged in a region of the torque transmission device that is located opposite the primary power take-off shaft.

5. The torque transmission device recited in claim 1 wherein the damper input element is coupled to the primary power take-off shaft, wherein the transmission input element and the damper output element are coupled to each other, and wherein said transmission output element is coupled to said drive train shaft, and wherein said transmission output element is coupled to the rotor device, and wherein said transmission output element is supported on said damper input element, and wherein the transmission actuation device is arranged in a region of the torque transmission device located opposite the primary power take-off shaft.

6. The torque transmission device recited in claim 1 wherein said damper input element is coupled to the primary power take-off shaft, wherein the transmission input element and the damper output element are coupled to each other, and wherein said transmission output element is coupled to said drive train shaft, and wherein said transmission output element is coupled to the rotor device, and wherein said drive train shaft is supported in said primary power take-off shaft, and wherein the transmission actuation device is arranged in a region of the torque transmission device located opposite the primary power take-off shaft.

7. The torque transmission device as recited in claim 1 wherein the damper input element is coupled to the primary power take-of shaft, wherein the transmission input element and the damper output element are coupled to each other, and wherein said damper output element is coupled to said drive train shaft, and wherein said transmission output element is coupled to said rotor device, and wherein said transmission output element is supported on a housing portion that is stationary relative to said rotor device, and wherein the transmission actuation device is arranged in a region of the torque transmission device located opposite the primary power take-off shaft.

8. The torque transmission device as recited in claim 1 wherein the drive train shaft is a transmission input shaft.

9. The torque transmission device as recited in claim 1 wherein the secondary driving engine is an electromechanical energy converter.

10. The torque transmission device as recited in claim 1 wherein said rotor recess is arranged concentrically relative to said axis of rotation.

11. A drive train of a motor vehicle comprising:
the torque transmission device as recited in claim 1;
the primary driving engine having the primary power take-off shaft;
the secondary driving engine; and the drive train shaft.

* * * * *